United States Patent
Buchberger, Jr. et al.

(10) Patent No.: US 11,555,730 B2
(45) Date of Patent: Jan. 17, 2023

(54) IN-SITU METHOD AND APPARATUS FOR MEASURING FLUID RESISTIVITY

(71) Applicant: Applied Materials, Inc., Santa Clara, CA (US)

(72) Inventors: Douglas A. Buchberger, Jr., Livermore, CA (US); Gautam Pisharody, Newark, CA (US); Lancelot Huang, San Jose, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 56 days.

(21) Appl. No.: 17/067,344

(22) Filed: Oct. 9, 2020

(65) Prior Publication Data

US 2022/0113177 A1     Apr. 14, 2022

(51) Int. Cl.
*G01F 23/24* (2006.01)
*G01F 25/10* (2022.01)

(52) U.S. Cl.
CPC ............ *G01F 23/245* (2013.01); *G01F 25/13* (2022.01)

(58) Field of Classification Search
CPC ..................................................... G01N 27/07
See application file for complete search history.

(56) References Cited

U.S. PATENT DOCUMENTS

| | | | |
|---|---|---|---|
| 7,204,155 B2 | 4/2007 | Lane et al. | |
| 7,375,947 B2 | 5/2008 | Yang et al. | |
| 7,585,384 B2 | 9/2009 | Bera et al. | |
| 8,205,629 B2 | 6/2012 | Gregor et al. | |
| 2007/0018659 A1 | 1/2007 | Homan et al. | |
| 2008/0024111 A1 | 1/2008 | Dorfmueller et al. | |
| 2016/0003756 A1* | 1/2016 | Suzuki | G01N 27/20 210/85 |

FOREIGN PATENT DOCUMENTS

| | | |
|---|---|---|
| JP | 2014-153271 A | 8/2014 |
| KR | 10-2003-0006544 A | 1/2003 |
| KR | 101967546 B1 | 8/2019 |
| TW | 200845110 A | 11/2008 |
| WO | 2007142850 A2 | 12/2007 |

OTHER PUBLICATIONS

International Search Report and Written Opinion, International Applicaiton No. PCT/2021/049701, dated Dec. 30, 2021 consists of 10 pages.

* cited by examiner

*Primary Examiner* — Paul M. West
*Assistant Examiner* — Mark A Shabman
(74) *Attorney, Agent, or Firm* — Patterson + Sheridan, LLP (57) ABSTRACT

A method and apparatus for determining particle contamination of a process fluid is disclosed herein. In one example, a fluid resistivity measurement probe is provided. The system includes an upstream fluid conduit, a downstream fluid conduit, and a measuring section. The measuring section has a metal rod, and a ground electrode. The ground electrode surrounds and is coaxial with the metal rod. The upstream fluid conduit is coupled to a first end of the ground electrode. The downstream fluid conduit is coupled to a second end of the ground electrode. The metal rod and the ground electrode define a space therebetween. The space flows a fluid from the upstream fluid conduit to the downstream fluid conduit.

20 Claims, 6 Drawing Sheets

IN-SITU METHOD AND APPARATUS FOR MEASURING FLUID RESISTIVITY

BACKGROUND

Field

A method and apparatus for determining particle contamination of a process fluid is disclosed herein.

Description of the Related Art

Integrated circuits have evolved into complex devices that can include millions of components (e.g., transistors, capacitors and resistors) on a single chip. Photolithography is a process that may be used to form components on a chip, which includes forming a photoresist layer on a substrate. A chemically amplified photoresist may include a resist resin and a photoacid generator. The photoacid generator, upon exposure to electromagnetic radiation in a subsequent exposure stage, alters the solubility of the photoresist in the development process. In the exposure stage, a photomask or reticle may be used to selectively expose certain regions of the substrate to electromagnetic radiation. Exposure to light may decompose the photoacid generator, which generates acid and results in a latent acid image in the resist resin. After exposure, the substrate may be heated in a post-exposure bake process. Structures can then be formed into the substrate by creating vias and patterns into which material layers are deposited, forming various components of the integrated circuit.

During processing of material layers making up these integrated circuits, controlling particle generation and contamination enables deposited layers to meet the stringent specifications of manufacturers. Particle contamination during substrate processing can negatively influence control over the critical dimension (CD) in lithographic processes by causing substrate warpage. The atmosphere surrounding a process chamber can be a potential source of particle contamination, as contaminants may enter the process chamber from the surrounding environment. Contaminants may also enter the process chamber from surfaces of the process chamber, which can be fabricated from aluminum or stainless steel. In addition, undesirable particles that accumulate in the process chamber may cause metallic contamination from the substrate to migrate to the lithography tool chuck, or accumulate on the backside of the substrate. Particles on the backside of the substrate can cause cross contamination and electrical contact failures in interconnect structures, or change the planarity of the substrate. These electrical contact failures can shorten the useable lifetime of integrated circuits and may lead to premature device failure.

Therefore, there is a need for an apparatus and method of detecting particle contamination in the process chamber.

SUMMARY

Disclosed herein is a method and apparatus for determining particle contamination of a process fluid. In one example, a fluid resistivity measurement probe is provided. The fluid resistivity measurement probe includes an upstream fluid conduit, a downstream fluid conduit, and a measuring section. The measuring section has a metal rod, and a ground electrode. The ground electrode surrounds and is coaxial with the metal rod. The upstream fluid conduit is coupled to a first end of the ground electrode. The downstream fluid conduit is coupled to a second end of the ground electrode. The metal rod and the ground electrode define a space therebetween. The space flows a fluid from the upstream fluid conduit to the downstream fluid conduit.

In another example, the process chamber includes a plurality of walls defining an internal volume. A fluid source is configured to provide a process fluid to the internal volume. A measurement probe is fluidically coupled to the fluid source. The measurement probe includes an upstream fluid conduit coupled to a first end of the fluid source. A downstream fluid conduit is coupled to a second end of the fluid source. The measurement probe includes a measuring section. The measuring section includes a metal rod and a ground electrode. The ground electrode surrounds and is coaxial with the metal rod. The upstream fluid conduit is coupled to a first end of the ground electrode. The downstream fluid conduit is coupled to a second end of the ground electrode. A contact is electrically coupled to the ground electrode. The contact is configured to receive a metric from the measuring section. The metric corresponding to a resistivity of the process fluid.

In yet another example, a method of detecting contamination in a process fluid is provided. The method includes determining an electrical resistivity of a process fluid entering or exiting a process chamber. The process chamber is disposed within a recirculation path. The process fluid circulates within the recirculation path. A measurement probe is fluidically coupled to the recirculation path. The measurement probe includes a measuring section that includes a metal rod and a ground electrode. The ground electrode surrounds and is coaxial with the metal rod. The metal rod and the ground electrode define a space therebetween. The space flows the process fluid through the recirculation path. The method further includes outputting an electrical metric from the measurement probe corresponding to the electrical resistivity of the process fluid. Additionally, the method includes comparing the electrical resistivity to a threshold. The threshold corresponds to a level of contamination of the process fluid. One or more recirculation components disposed in the recirculation path is replaced if the threshold is met or exceeded.

BRIEF DESCRIPTION OF THE DRAWINGS

So that the manner in which the above recited features of the present disclosure can be understood in detail, a more particular description of the disclosure, briefly summarized above, may be had by reference to examples, some of which are illustrated in the appended drawings. It is to be noted, however, that the appended drawings illustrate only exemplary examples and are therefore not to be considered limiting of its scope, and may admit to other equally effective examples.

To facilitate understanding, identical reference numerals have been used, where possible, to designate identical elements that are common to the figures. It is contemplated that elements and features of one example may be beneficially incorporated in other examples without further recitation.

DETAILED DESCRIPTION

A method and apparatus for determining particle contamination of a process fluid is herein disclosed. Undesirable particles in the process fluid can impart unknown and uncontrolled electrical characteristics on the process fluid. For example, debris from process substrates or metals introduced from the environment can increase the electrical resistivity of the process fluid. Variations in the fluid resistivity can alter the dc current of the processing chamber and influence the voltage drops across the individual layers of a photoresist stack. These variations in voltage drops across the individual layers can cause process shifts, layer delamination, and other undesirable effects. Control over the process fluid properties enables better control of the process results.

The method and apparatus disclose herein, enables in-situ determination of process fluid contamination by measuring an electrical characteristic of the process fluid. Advantageously, the method and apparatus do not require process fluid samples to be removed from the process chamber and independently tested. Conventional approaches to sampling and testing do not enable real-time determination of process fluid contamination and may require process chamber downtime while test results are acquired, thereby reducing overall process yield. Monitoring the resistivity of the process fluid in-situ with the apparatus and method disclosed herein, enables real-time determination of fluid properties without the time and expense of extracting fluid samples, causing process chamber downtime. As such, by determining the resistivity of the process fluid, in-situ determination of particle contamination of the process fluid is enabled by the apparatus and method disclosed.

Figure 1:
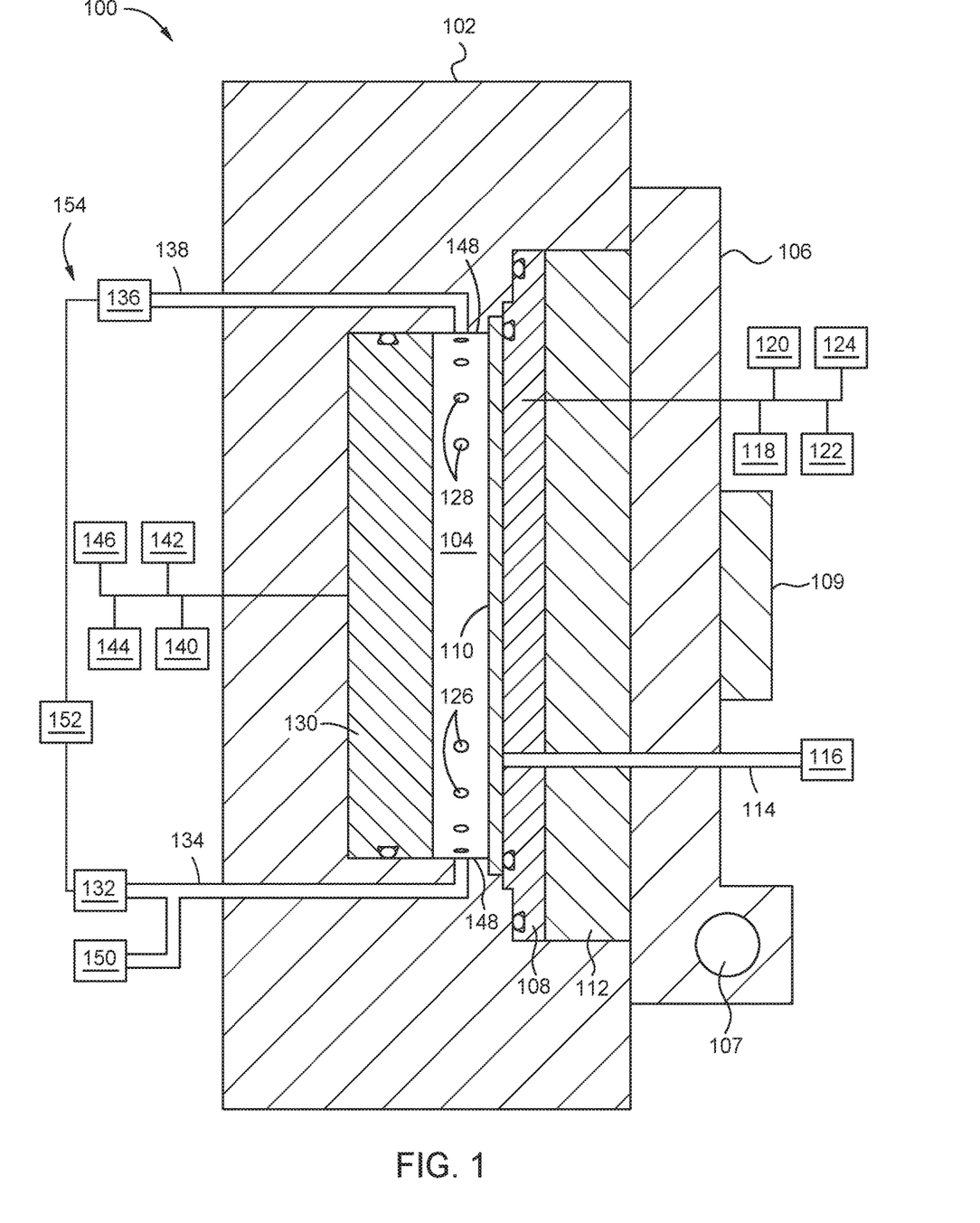
FIG. 1 illustrates a schematic, cross-sectional view of a process chamber 100 configured to flow a process fluid.

FIG. 1 illustrates a schematic, cross-sectional view of the process chamber 100 configured to flow the process fluid. In one example, the process chamber 100 is configured for performing immersion field guided post exposure bake (iFGPEB) processes. The process chamber 100 is positioned in a substantially vertical orientation when a substrate 110 is processed, in one example. The process chamber 100 includes a chamber body 102, which is manufactured from a metallic material, such as aluminum, stainless steel, or alloys and combinations thereof. Alternatively, the chamber body 102 is manufactured from polymer materials, such as polytetrafluoroethylene (PTFE), or high temperature plastics, such as polyether ether ketone (PEEK).

The chamber body 102 defines, at least partially, a process volume 104 therein. For example, a sidewall 148 of the chamber body 102 defines a diameter of the process volume 104. The process volume is further defined by a first electrode 108 and a second electrode 130. A first plurality of fluid ports 126 are formed in the chamber body 102 through the sidewall 148. A second plurality of fluid ports 128 are formed in the sidewall 148 of the chamber body 102 opposite the first plurality of fluid ports 126. The first plurality of fluid ports 126 are in fluid communication with a process fluid source 132 via a fluid inlet 134. The second plurality of fluid ports 128 are in fluid communication with a fluid outlet 136 via a second conduit 138. The process fluid source 132 is configured to preheat process fluid to a temperature of between about 70° C. and about 130° C., such as about 110° C., prior to the fluid entering the process volume 104.

A purge gas source 150 is in fluid communication with the process volume 104 via the fluid inlet 134 and the first plurality of fluid ports 126. Gases provided by the purge gas source 150 may include nitrogen, argon, inert gases and the like to purge the processing volume 104 during or after substrate processing. Purge gases are exhausted from the processing volume 104 via the fluid outlet 136. One or more recirculation components 152 can be disposed within a recirculation path 154. The recirculation path 154 couples the fluid outlet 136 to the fluid inlet 134. As described in further details below, the recirculation components 152 may include measuring devices, pumps, filters, refill tanks, valves, conduits, and other components necessary to circulate the process fluid exiting the fluid outlet 136 back to the fluid inlet 134.

A door 106 is operably coupled to the chamber body 102. In the illustrated example, the door 106 is oriented in a processing position such that the door 106 is disposed adjacent to and abuts the chamber body 102. The door 106 is formed from materials similar to the materials selected for the chamber body 102. Alternatively, the chamber body may be formed from a first material, such as a polymeric material, and the door 106 may be formed from a second material different from the first material, such as a metallic material. A shaft 107 extends through the door 106 and provides an axis about which the door 106 rotates to open and close the door 106.

The door 106 may be coupled to a track (not shown) and have a motor (not shown) coupled to the door 106 and/or the track, in order to facilitate movement of the door 106. The door 106 may rotate about 90° from the illustrated processing position to a loading position such that positioning of the substrate 110 on the first electrode 108 can be performed with a reduced probability of substrate breakage during loading.

A backing plate 112 is coupled to the door 106 and the first electrode 108 is coupled to the backing plate 112. The backing plate 112 is formed from materials similar to the door 106 or the chamber body 102. The first electrode 108 may be formed from an electrically conductive metallic material. In addition, the material utilized for the first electrode 108 may be a non-oxidative material. The materials selected for the first electrode 108 provide for desirable current uniformity and low resistance across the surface of the first electrode 108. In certain examples, the first electrode 108 is a segmented electrode configured to introduce voltage non-uniformities across the surface of the first electrode 108. In this example, a plurality of power sources are utilized to power different segments of the first electrode 108.

The first electrode 108 is sized to accommodate attachment of the substrate 110 thereon. The first electrode 108 is also sized to allow for positioning adjacent the chamber body 102 and the process volume 104. In one example, the first electrode 108 is coupled to the backing plate 112 and the door 106. In another example, the first electrode 108 is rotatably coupled to the backing plate 112 and the door 106. In the example disclosed herein, a motor 109 is coupled to the door 106 and is configured to impart rotational movement on either the backing plate 112 or the first electrode 108. In one example, the first electrode 108 is configured as a grounded electrode.

A vacuum source 116 is in fluid communication with a substrate receiving surface of the first electrode 108. The vacuum source 116 is coupled to a conduit 114 which extends from the vacuum source 116 through the door 106, the backing plate 112, and the first electrode 108. The vacuum source 116 is configured to vacuum chuck the substrate 110 to the first electrode 108.

A heat source 118, a temperature sensing apparatus 120, a power source 122, and a sensing apparatus 124 are coupled to the first electrode 108. The heat source 118 provides power to one or more heating elements, such as resistive heaters, disposed within the first electrode 108. It is also contemplated that the heat source 118 may provide power to heating elements disposed within the backing plate 112. The heat source 118 is configured to heat either the first electrode 108 and/or or the backing plate 112 to facilitate preheating of fluid during substrate processing (i.e., iFGPEB processes). The heat source 118 may also be utilized to maintain a desired temperature of the process fluid during substrate processing in addition to or distinct from preheating the process fluid. In one example, the heat source 118 is configured to heat the first electrode 108 to a temperature of between about 70° C. and about 130° C., such as about 110° C.

The temperature sensing apparatus 120, such as a thermocouple, is communicatively coupled to the heat source 118 to provide temperature feedback and facilitate heating of the first electrode 108. The power source 122 is configured to supply between about 1 V and about 20 kV to the first electrode 108. Depending on the type of process fluid utilized, current generated by the power source 122 may be on the order of tens of nano-amps to hundreds of milliamps. In one example, the power source 122 is configured to generate electric fields ranging from about 1 kV/m to about 2 MV/m. In some examples, the power source 122 is configured to operate in either voltage controlled or current controlled modes. In both modes, the power source may output AC, DC, and/or pulsed DC waveforms. Square or sine waves may be utilized if desired. The power source 122 may be configured to provide power at a frequency of between about 0.1 Hz and about 1 MHz, such as about 5 kHz. The duty cycle of the pulsed DC power or AC power may be between about 5% and about 95%, such as between about 20% and about 60%.

The rise and fall time of the pulsed DC power or AC power may be between about 1 ns and about 1000 ns, such as between about 10 ns and about 500 ns. The sensing apparatus 124, such as a voltmeter or the like, is communicatively coupled to the power source 122 to provide electrical feedback and facilitate control of the power applied to the first electrode 108. The sensing apparatus 124 may also be configured to sense a current applied to the first electrode 108 via the power source 122.

The second electrode 130 is coupled to the chamber body 102 adjacent the process volume 104 and partially defines the process volume 104. Similar to the first electrode 108, the second electrode 130 is coupled to a heat source 140, a temperature sensing apparatus 142, a power source 144, and a sensing apparatus 146. The heat source 140, the temperature sensing apparatus 142, the power source 144, and the sensing apparatus 146 may function similarly to the heat source 118, the temperature sensing apparatus 120, the power source 122, and the sensing apparatus 124. In one example, the second electrode 130 is an actively powered electrode and the first electrode 108 is a grounded electrode. As a result of the aforementioned electrode arrangement, acid generated upon exposure of a resist disposed on the substrate 110 may be modulated during substrate (i.e., iFGPEB) processing to improve patterning and resist deprotection characteristics.

Figure 2:
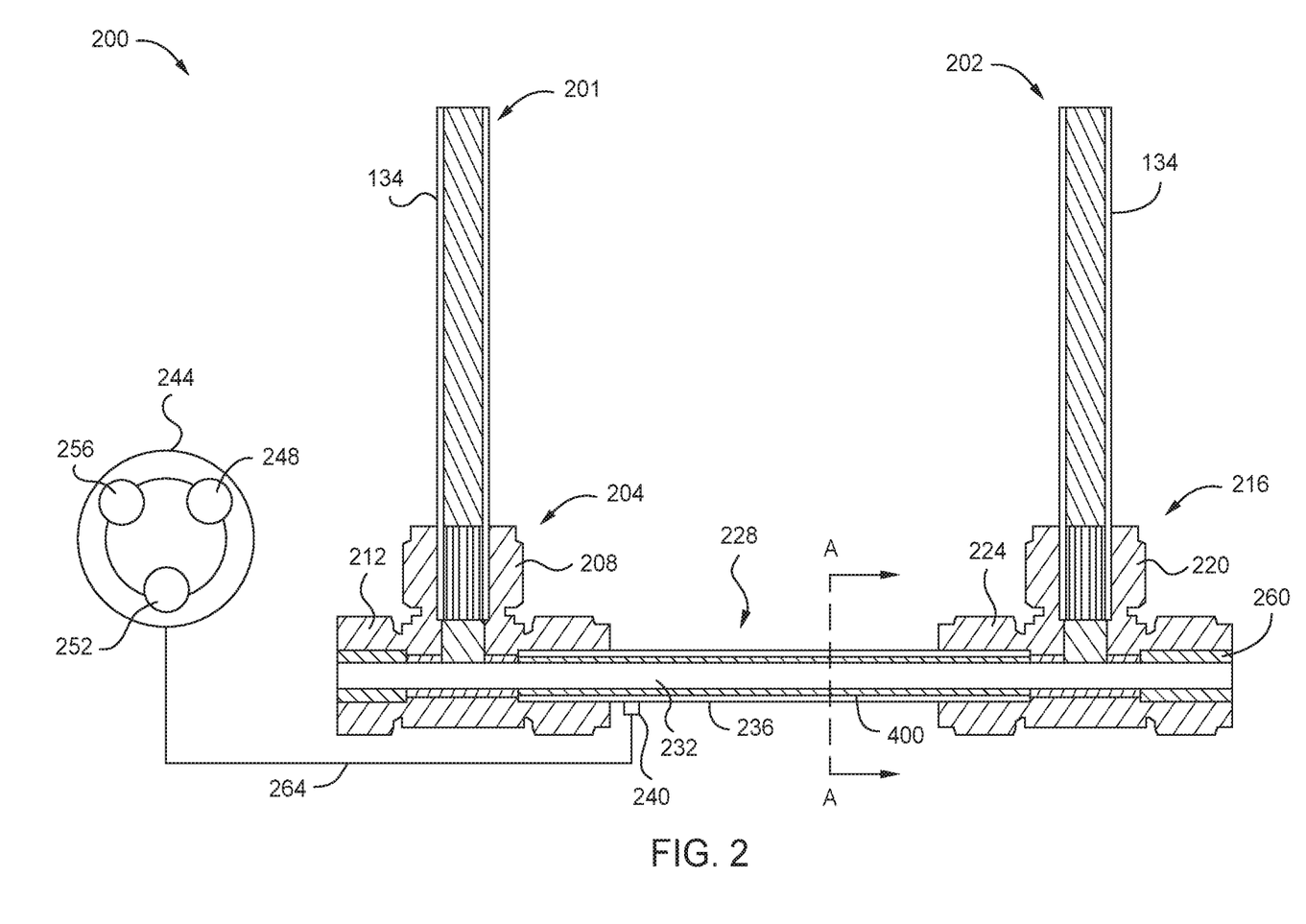
FIG. 2 is a schematic, cross-sectional view of a fluid resistivity measurement probe for measuring fluid resistivity of the process fluid in the process chamber of FIG. 1.

FIG. 2 is a schematic, cross-sectional view of the fluid resistivity measurement probe 200 for measuring fluid resistivity of the process fluid in the process chamber 100 of FIG. 1. The fluid resistivity measurement probe 200 includes a measurement section 228 disposed between an upstream coupling 204 coupled to an inlet 201, and a downstream coupling 216 coupled to an outlet 202. In one example, the inlet 201 and the outlet 202 are each in-line with and disposed along the fluid inlet 134. Each of the upstream coupling 204 and the downstream coupling 216 are fluidically coupled to the inlet 201 and to the outlet 202.

The upstream coupling 204 includes an upstream vertical coupling 208 and an upstream horizontal coupling 212. The upstream vertical coupling 208 is directly coupled to the inlet 201. The upstream horizontal coupling 212 is physically connected to the upstream vertical coupling 208, and the horizontal coupling 212 disposed substantially orthogonal to the upstream vertical coupling 208. The upstream horizontal coupling 212 is fluidically coupled to the inlet 201 and to the outlet 202. The upstream vertical coupling 208 is press-fit to the inlet 201, in one example. In another example, the upstream vertical coupling 208 is heat welded to the inlet 201.

The upstream vertical coupling 208 may include a threaded surface and a threaded nut, whereby the inlet 201 is compressively fit within the upstream vertical coupling 208 by inserting and turning the threaded nut relative to the threaded surface. In yet another example, the upstream vertical coupling 208 is has a quick connect or push fitting, which includes a collet, an o-ring surrounding the collect, and a body disposed within the upstream vertical coupling 208. The inlet 201 can be coupled to the upstream vertical coupling 208 by passing the inlet 201 through the collet into body of the upstream vertical coupling 208, creating a seal. The inlet 201 is released from the upstream vertical coupling 208 by relative movement between the collect, body, and inlet 201.

The downstream coupling 216 has a downstream vertical coupling 220 and a downstream horizontal coupling 224. The downstream vertical coupling 220 is directly coupled to the outlet 202. The downstream horizontal coupling 224 is disposed substantially orthogonal to the downstream vertical coupling 220. The downstream vertical coupling 220 is physically connected to the downstream horizontal coupling 224, and the downstream horizontal coupling 224 is fluidically coupled to the inlet 201 and to the outlet 202. Suitable materials for the upstream coupling 204 and the downstream coupling 216 include polymers, plastics, and other non-conductive or non-metallic materials.

Similar to the examples above regarding the upstream vertical coupling 208, each of the upstream horizontal coupling 212, downstream vertical coupling 220, and downstream horizontal coupling 224 can be a configured as a threaded surface and a threaded nut. In another example, the upstream horizontal coupling 212, downstream vertical coupling 220, and downstream horizontal coupling 224 can be a configured as a quick connect or push fitting. In yet another example, each of the upstream horizontal coupling 212, downstream vertical coupling 220, and downstream horizontal coupling 224 may be heat welded.

The measuring system 200 has a measurement section 228 fluidically coupled between the upstream coupling 204 and the downstream coupling 216. The measurement section 228 is physically coupled to the upstream horizontal coupling 212 and the downstream horizontal coupling 224. Process fluid is configured to flow through the inlet 201 and pass through the upstream coupling 204, and then proceed through the measurement section 228, the downstream coupling 216, and exits through the outlet 202.

The measurement section 228 includes a metal rod 232 and a ground electrode 236. The metal rod 232 is connected to a voltage source (not shown). The ground electrode 236 circumscribes the metal rod 232. Accordingly, the metal rod 232 and ground electrode 236 are substantially coaxial. A surface area of the measurement section 228 is defined by an overlap of a surface area of the metal rod 232 and a surface area of the ground electrode 236. As such, a length of the measurement section 228 is less than or equal to a length of the ground electrode 236. Although the measurement section 228 is shown as a substantially linear, the measurement section 228 is not limited to this shape. Suitable configurations of the measurement section 228 may include a bend or a u-shape, so long as a distance between the metal rod 232 and the ground electrode 236 is substantially equal throughout the length of the measurement section 228.

The metal rod 232, in one example, extends horizontally through the upstream horizontal coupling 212 and through each end of the downstream horizontal coupling 224. In one example, the metal rod 232 is a solid cylindrical structure. Exemplary materials include conductive metals such as aluminum, copper, and iron-containing metals. However, the metal rod 232 is not limited to these materials, and can be any conductive metal.

The ground electrode 236 is a conductive metal. The ground electrode 236 is coupled to a ground (not shown), and has a contact 240 on the surface of the ground electrode 236 that is coupled to a controller 244. The ground electrode 236 extends horizontally through at least a portion of the upstream horizontal coupling 212 and through at least a portion of the downstream horizontal coupling 224. The ground electrode 236 is a hollow tube circumscribing the metal rod 232. The ground electrode 236 is a conductive metal, such as aluminum, copper, and iron-containing metals.

A spacer 260 having an outer radius that is substantially equal to an outer radius of the ground electrode 236 is shown. An inner diameter of the spacer 260 has an inner radius that is substantially equal to the outer radius of the metal rod 232. The spacer 260, a substantially hollow rod, is used to compress the metal rod 232 within the upstream horizontal coupling 212 and/or the downstream horizontal coupling 224, as shown. The spacer 260 is made of a non-conductive material, such as a plastic or a polymer. As such, the ground electrode 236 and the metal rod 232 are compressively fit into the upstream horizontal coupling 212 and the downstream horizontal coupling 224.

The controller 244 is electrically coupled to the contact 240 on a surface of the ground electrode 236 of the measurement section 228. A wire 264 electrically connects the controller to the ground electrode 236, via the contact 240. The controller 244 includes a processor 248, memory 252, and support circuits 256. The processor 248 may be one of any form of general purpose microprocessor, or a general purpose central processing unit (CPU), each of which can be used in an industrial setting, such as a programmable logic controller (PLC), supervisory control and data acquisition (SCADA) systems, or other suitable industrial controller.

The memory 252 is non-transitory and may be one or more of readily available memory such as random access memory (RAM), read only memory (ROM), or any other form of digital storage, local or remote. The memory 252 contains instructions, that when executed by the processor 248, facilitates the operation of the measurement section 228. The instructions in the memory 252 are in the form of a program product such as a program that implements the method of the present disclosure. The program code of the program product may conform to any one of a number of different programming languages. Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are examples of the present disclosure. In one example, the disclosure may be implemented as the program product stored on a computer-readable storage media (e.g., 252) for use with a computer system (not shown). The program(s) of the program product define functions of the disclosure, described herein.

Figure 3:
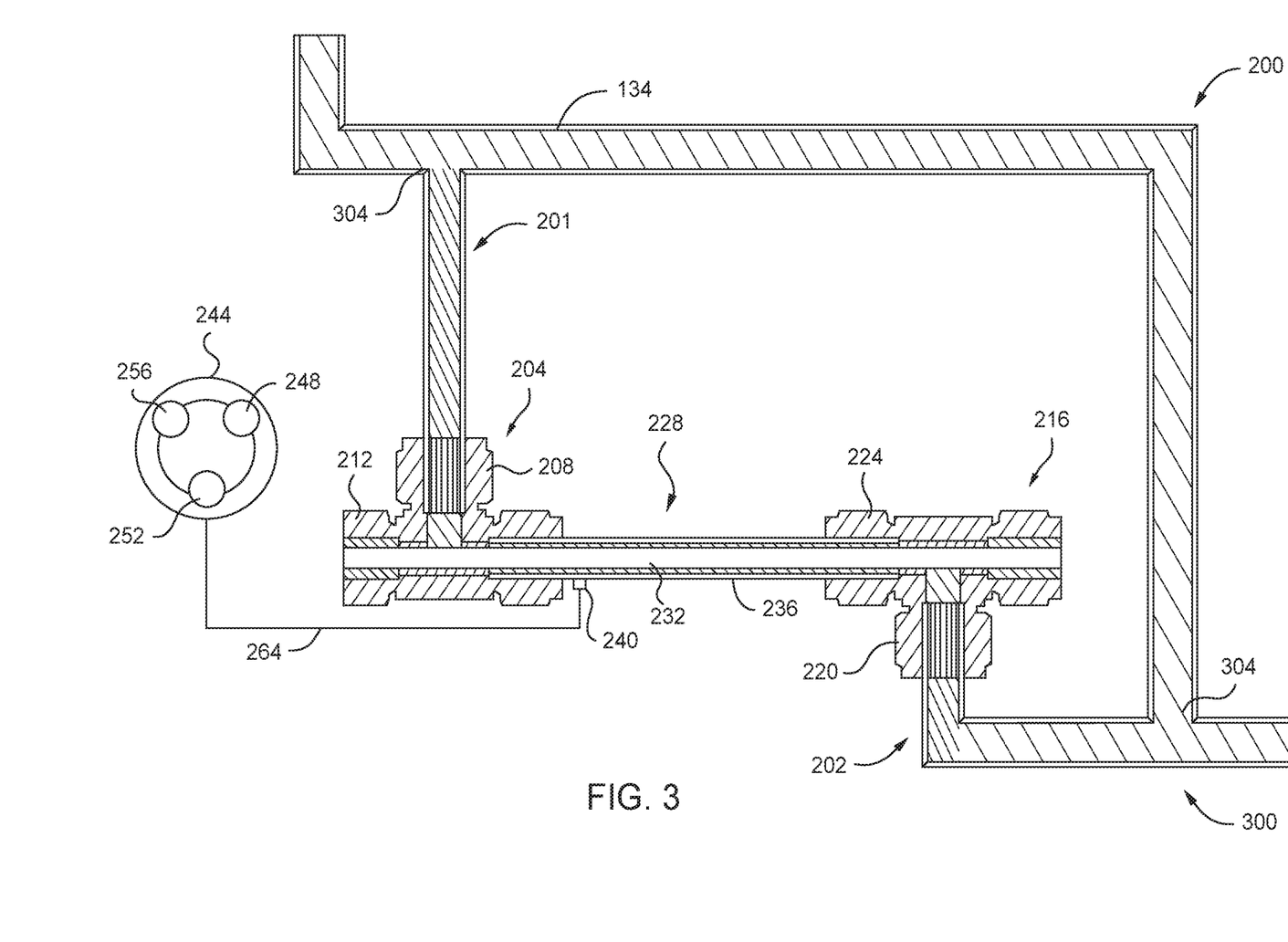
FIG. 3 is a schematic, cross-sectional view of the fluid resistivity measurement probe, shown in FIG. 2 having a fluid bypass.

FIG. 3 is a schematic, cross-sectional view of the fluid resistivity measurement probe 200, shown in FIG. 2 having a fluid bypass 300. When the fluid resistivity measurement probe 200 utilizes the fluid bypass 300, the inlet 201 is coupled to an upstream port 304 of the fluid inlet 134, and the outlet 202 is coupled to a downstream port 304 of the fluid inlet 134.

A first portion of the process fluid, i.e., a sample, is directed to the fluid resistivity measurement probe 200. A second portion of the process fluid continues directly along the fluid inlet 134 toward the process chamber 100, as described above. The fluid bypass 300 fluidically couples the outlet 202 to the downstream port 304 of the fluid inlet 134. The first portion is returned to the fluid inlet 134 and is comingled with the second portion of the process fluid after the first portion passes through the measurement section 228. Advantageously, an electrical property of the process fluid can be determined without requiring all of the process fluid to pass through the fluid resistivity measurement probe 200. As such, a velocity of process fluid that does not pass through the measurement section 228 is not reduced, and a pressure of the process fluid is not substantially increased on an upstream side of the measurement section 228. The fluid bypass 300 can be disposed in the fluid outlet, in substantially the same manner described above.

Figure 4:
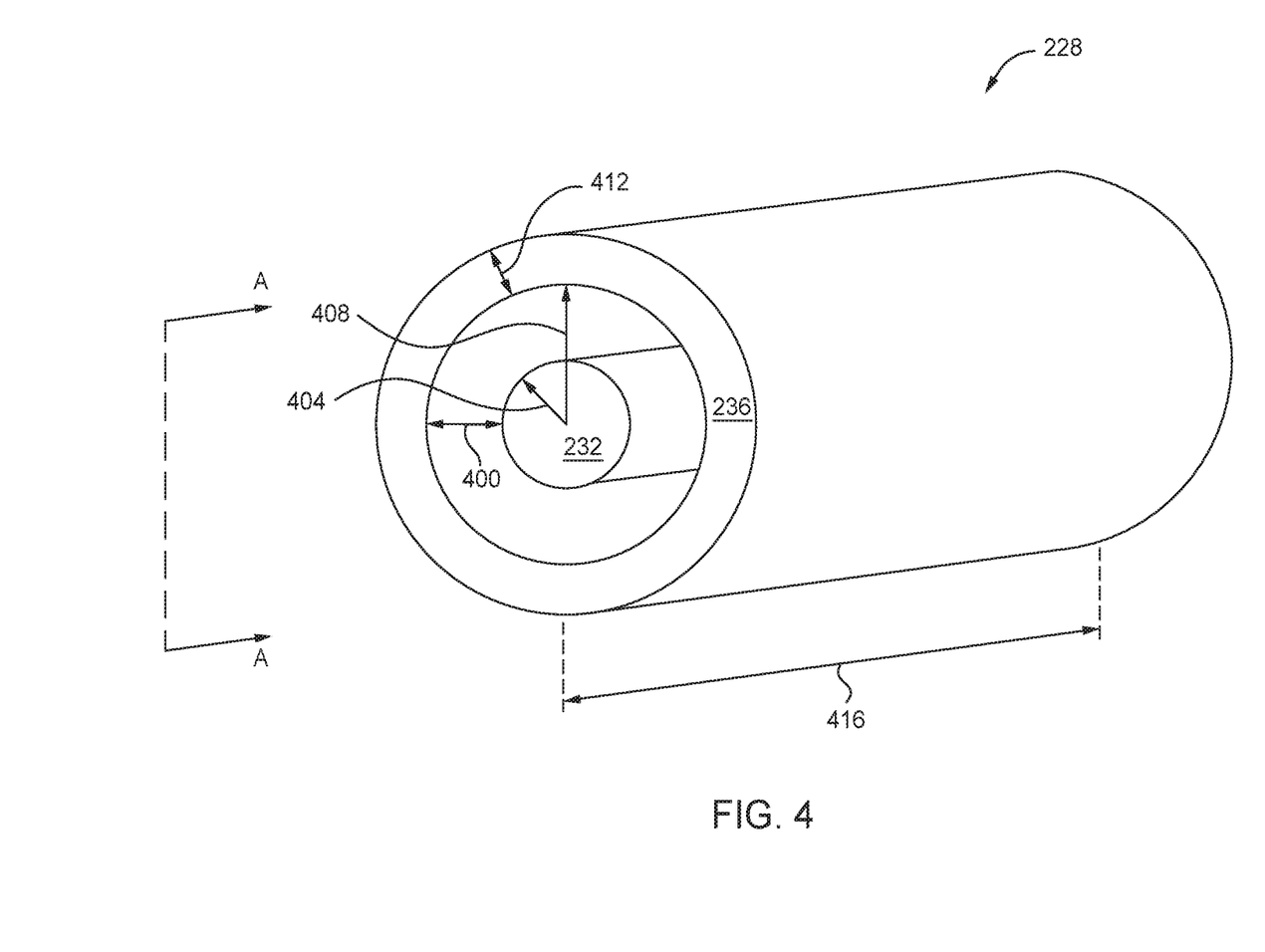
FIG. 4 is an isometric cross-sectional view of the measuring section of the fluid resistivity measurement probe, taken along A-A in FIG. 2.

FIG. 4 is an isometric cross-sectional view of the measurement section 228 of the fluid resistivity measurement probe 200, taken along A-A in FIG. 2. A gap 400 is defined by the space between the metal rod 232 and the ground electrode 236. A cross-sectional area of the gap 400 is substantially a toroid shape. The metal rod 232 has an outer radius 404, and the metal rod 232 is at least as long as a length 416. As noted above, a total length of the metal rod 232 may be greater than the length 416. The ground electrode 236 has an inner radius 408 and a thickness 412. The gap 400 is the space between the outer radius 404 of the metal rod 232 (i.e., outer surface of the metal rod 232) and the inner radius 408 of the ground electrode 236 (i.e., inner surface of the ground electrode 236). The ground electrode 236 is as long as the length 416. The process fluid flows through the gap 400 while the resistivity of the fluid is measured by the measurement section 228. The inner surface of the ground electrode 236 and the outer surface of the metal rod 232 are each in fluidic contact with the process fluid while the resistivity is determined.

Figure 5:
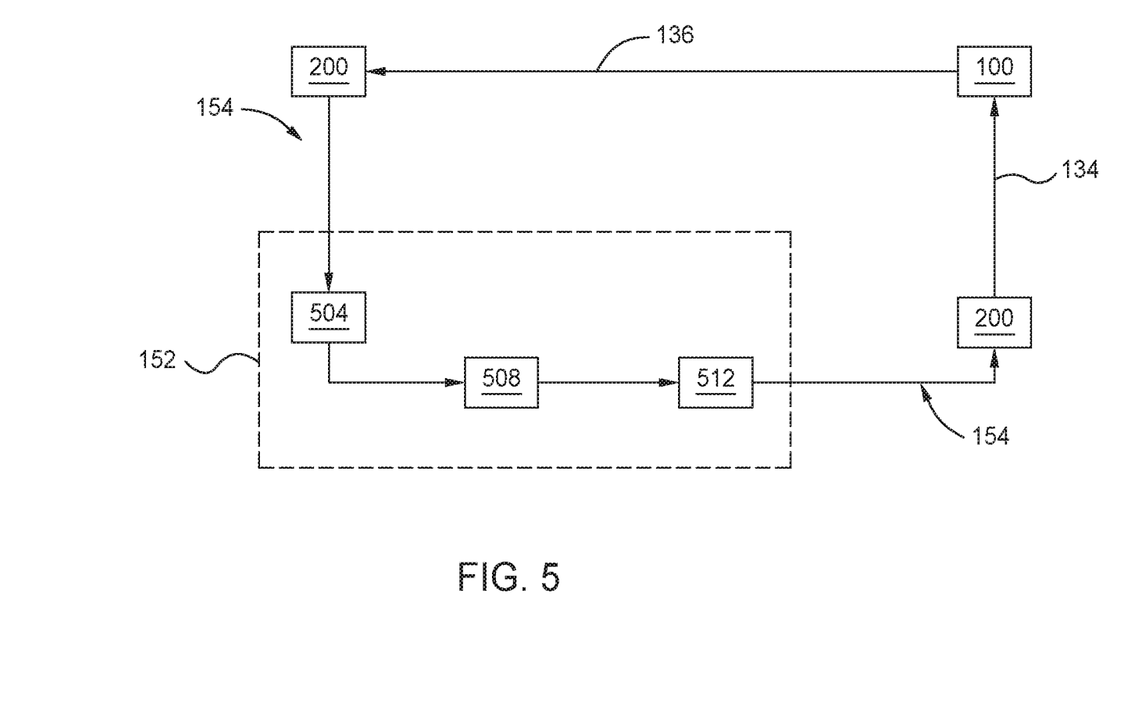
FIG. 5 is a plan view of the fluid resistivity measurement probes disposed within a recirculation path shown in FIG. 1.

FIG. 5 is a plan view of fluid resistivity measurement probes 200 disposed within the recirculation path 154 shown in FIG. 1. Recirculation components 152 include one or more of a process fluid refill tank 504 into which new process fluid is supplied, a pump 508, and a particle filter 512. The recirculation path 154 fluidically couples each of the refill tank 504, the pump 508, and the particle filter 512 to the process chamber 100. As such, the recirculation path 154 fluidically couples each of the refill tank 504, the pump 508, and the particle filter 512 to the fluid inlet 134 and the fluid outlet 136. It is understood that each of the refill tank 504, the pump 508, and the particle filter 512 may be coupled to a controller, such as the controller 244 shown in FIG. 2. The pump 508 is configured to recirculate the process fluid in the recirculation path 154, redirecting the process fluid exiting the fluid outlet 136 back to the fluid inlet 134. The particle filter 512, in one example, substantially removes contaminants and particles from the process fluid having a size between about 2 micrometers and about between 10 micrometers, such as about 7 micrometers. In another example, the particle filter 512 filters particles having a size between about 4 micrometers and about 6 micrometers, such as about 5 micrometers.

The fluid resistivity measurement probe 200 can be disposed downstream of the process fluid refill tank 504 in the recirculation path 154. Similarly, the fluid resistivity measurement probe 200 is disposed downstream of the process fluid refill tank 504 within the fluid outlet 136. As such, fluid resistivity of the used process fluid exiting the process chamber 100 through the fluid outlet 136 is measured by the fluid resistivity measurement probe 200. Fluid resistivity of the used process fluid in the fluid outlet 136 or the recirculation path 154 is determined according to the method disclosed below.

In a different example, the fluid resistivity measurement probe 200 is disposed upstream of the particle filter 512 within the fluid inlet 134. Similarly, the fluid resistivity measurement probes 200 can be disposed in the recirculation path 154, upstream of the particle filter 512. As such, a fluid resistivity of the process fluid is measured by the fluid resistivity measurement probe 200 before the process fluid enters the process chamber 100. Fluid resistivity of the process fluid entering the process chamber 100 is determined according to the method disclosed below.

Figure 6:
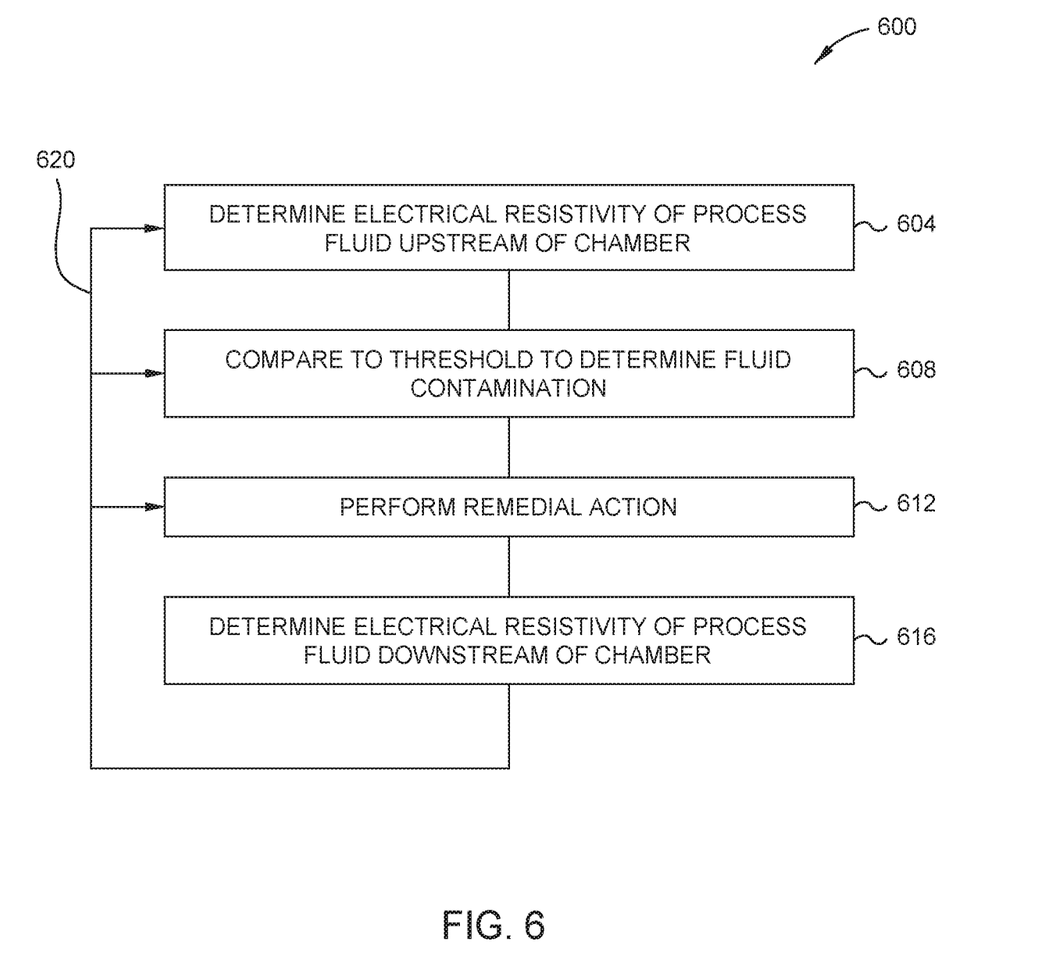
FIG. 6 is a flow chart of an exemplary method of measuring the resistivity of the process fluid.

FIG. 6 is a flow chart of an exemplary method 600 of measuring the resistivity of the process fluid. At operation 604, the electrical resistivity of a process fluid configured to process substrates is determined at an upstream location from a process chamber, such as the process chamber 100 shown in FIG. 1. A voltage is applied at the upstream location to a fluid resistivity measurement probe (e.g., fluid resistivity measurement probe 200) configured to flow the process fluid therethrough. Voltage generates a current to flow from the metal rod 232 through the process fluid into the ground electrode 236. A resistivity of the fluid is calculated based upon the current that flows through the process fluid within the fluid resistivity measurement probe 200. For example, a voltage V is applied to the metal rod 232 surrounded by the ground electrode 236. Voltage is applied to the metal rod 232 by a voltage source (not shown). Current I flows from the metal rod 232 through the gap 400 into the ground electrode 236. As disclosed above, a cross-section of the gap 400 is substantially toroid in shape. The voltage is applied to the metal rod 232 at between about 50 V and about 500 V, such as about 250 V, or about 300 V, in one example. In another example, the voltage is applied to the metal rod 232 at between about 75 V to about 150 V, such as about 100 V or about 125 V. In another example, the voltage is less than 500 V. Voltages above 500 V may causing arcing between the metal rod 232 and the ground electrode 236.

The controller 244, shown in FIG. 2, measures the current and calculates a resistance R, the controller 244 being electrically coupled to the ground electrode 236 through the contact 240. The metal rod 232 and the ground electrode 236 are known metals, so the controller 244 can be programmed to filter out any resistance inherent to the metals used in the metal rod or ground electrode. The resistivity p of the process fluid may be determined at the upstream location as shown in FIG. 5, where the fluid resistivity measurement probe 200 is disposed in the fluid inlet 134. The fluid resistivity measurement probe 200 can be in the recirculation path 154 between the particle filter 512 and the process chamber 100, in another example.

A resistivity ($\rho$=RA/L) of the process fluid is determined based upon the calculated resistance, where R is the calculated resistance, A is the surface area of the ground electrode 236 and L is the distance between the metal rod 232 and the ground electrode 236. In one example, the resistivity $\rho$ is proportional to the surface area of an inner surface (A=$2\pi r^* l_1$) of the ground electrode 236, where r is equal to the inner radius 408 and $l_1$ is equal to the length 416, and L is equal to the length of the gap 400.

At operation 608, the resistivity p of the process fluid is compared to an upstream threshold $th_{up}$. The upstream threshold $th_{up}$ is stored on a memory device, such as the memory 252. The upstream threshold $th_{up}$ corresponds to a level of particle contamination in the process fluid. If the upstream fluid resistivity $\rho$ is greater than or equal to the upstream threshold $th_{up}$ ($\rho \geq th_{up}$), the controller 244 sends a warning to an input/output device, such as a display unit or an audio device (not shown). Where the upstream fluid resistivity $\rho$ is less than the upstream threshold $th_{up}$, the controller 244 sends a signal different from the warning to the input/output device.

A remedial operation can be performed, including replacing one or more components disposed within a fluid path coupled to the process chamber at operation 612. In one example of a remedial operation, recirculation components 152 can be replaced or cleaned, if $\rho \geq th_{up}$. For example, a particle filter is replaced or cleaned, such as the particle filter 512 shown in FIG. 5. In another example remedial operation, if $\rho \geq th_{up}$, a volume of new process fluid is introduced to a refill tank, such that the volume of new process fluid is increased relative to the used process fluid, reducing the volume of used process fluid returned to the process chamber. A concentration of contaminants in the process fluid is reduced in this manner.

In yet other example, both remedial operations are taken when $\rho \geq th_{up}$. For example, when $\rho \geq th_{up}$, the particle filter 512 is replaced and the volume of new process fluid entering the refill tank 504 is increased relative to the used process fluid, decreasing the particle contamination of the process fluid until $\rho < th_{up}$.

At operation 616, the electrical resistivity of the process fluid is determined at a downstream location of the process chamber. As disclosed above, a voltage is applied to a fluid resistivity measurement probe disposed at the downstream location. For example, the resistivity $\rho$ of the process fluid is determined at the downstream location, where the fluid resistivity measurement probe 200 is disposed in the fluid outlet 136, as shown in FIG. 5. In another example, the fluid resistivity measurement probe 200 can be disposed in the recirculation path 154 between the refill tank 504 and the process chamber 100. Fluid resistivity is measured at operation 616 in substantially the same manner as fluid resistivity is measured at operation 604.

Operation 616 proceeds to operation 608, in one example. As disclosed similarly above, if the downstream fluid resistivity ρ is greater than or equal to the downstream threshold $th_d$ ($\rho \geq th_d$), the controller 244 sends a warning to an input/output device. Should the fluid resistivity ρ be less than the downstream threshold $th_d$ ($\rho < th_d$), a signal different from the warning to the controller 244. The downstream threshold $th_d$ is compared to the fluid resistivity ρ at the downstream location, described previously.

Next, operation 612 is again performed. The remedial operation is performed if $\rho \geq th_d$, as described above. For example, as detailed above, recirculation components 152 can be replaced or cleaned, or a volume of new process fluid introduced to the refill tank 504 can be increased relative to the used process fluid. The particle filter 512 can be cleaned or replaced, or new process fluid can be added to the refill tank 504, as described above. The downstream threshold $th_d$ is different than the upstream threshold $th_{up}$, in one example. In another example, the downstream threshold $th_d$ and the upstream threshold $th_{up}$ are equal.

At operation 620, the method 600 returns to operation 604 and the fluid resistivity is determined at a new time iteration at the upstream location. The method 600 can repeat for a predetermined period of time or for a predetermined number of measurement cycles.

Disclosed herein, is a method and apparatus for determining particle contamination of a process fluid during substrate processing. Advantageously, the resistivity of the process fluid corresponds to particle contamination of the process fluid. As such, remedial actions may be taken based on the determined resistivity of the process fluid to reduce contaminants in the process fluid. While the foregoing is directed to examples of the present disclosure, other and further examples of the disclosure may be devised without departing from the basic scope thereof, and the scope thereof is determined by the claims that follow.

What is claimed is:

1. A fluid resistivity measurement probe, comprising:
an upstream fluid conduit;
a downstream fluid conduit; and
a measuring section, comprising:
 a metal rod; and
 a ground electrode coaxial with the metal rod, wherein the upstream fluid conduit is coupled to a first end of the ground electrode, and the downstream fluid conduit is coupled to a second end of the ground electrode, the metal rod and the ground electrode defining a space therebetween for flowing a fluid from the upstream fluid conduit to the downstream fluid conduit, wherein the measuring section is configured to provide a metric of resistivity of a fluid based upon a surface area of the ground electrode within the space and a distance between the metal rod and the ground electrode when a voltage is applied to the metal rod.

2. The fluid resistivity measurement probe of claim 1, wherein the metal rod is configured to receive a voltage between about 50 V and about 500 V.

3. The fluid resistivity measurement probe of claim 1, wherein an electrical current is flowed from the metal rod through the space into the ground electrode.

4. The fluid resistivity measurement probe of claim 3, wherein the space is substantially a toroid.

5. The fluid resistivity measurement probe of claim 1, further comprising:
a contact electrically coupled to the ground electrode, the contact configured to receive a metric from the measuring section.

6. The fluid resistivity measurement probe of claim 1, further comprising:
an upstream coupling connecting the upstream fluid conduit to the first end of the ground electrode; and
a downstream coupling connecting the downstream fluid conduit to the second end of the ground electrode.

7. The fluid resistivity measurement probe of claim 6, wherein the upstream coupling and the downstream coupling are made of a plastic material.

8. The fluid resistivity measurement probe of claim 1, wherein the upstream fluid conduit and the downstream fluid conduit are made of a plastic material.

9. The fluid resistivity measurement probe of claim 1, further comprising:
a bypass, the bypass connecting the upstream fluid conduit to the downstream fluid conduit, wherein the bypass is configured to flow a first portion of process fluid from the upstream fluid conduit without flowing the first portion through the measuring section, and a second portion of process fluid from the upstream fluid conduit through the measuring section, the first portion and the second portion of the process fluid flowing through the downstream fluid conduit.

10. A process chamber, comprising:
a plurality of walls defining an internal volume;
a fluid source configured to provide a process fluid to the internal volume;
a measurement probe fluidically coupled to the fluid source, the measurement probe comprising:
 an upstream fluid conduit coupled to a first end of the fluid source;
 a downstream fluid conduit coupled to a second end of the fluid source; and
 a measuring section, comprising:
  a metal rod; and
  a ground electrode coaxial with the metal rod, wherein the upstream fluid conduit is coupled to a first end of the ground electrode, and the downstream fluid conduit is coupled to a second end of the ground electrode; and
a contact electrically coupled to the ground electrode, the contact is configured to receive a metric from the measuring section, the metric corresponding to a resistivity of the process fluid, wherein the measuring section is configured to provide a metric of resistivity of a fluid based upon a surface area of the ground electrode within a space between the metal rod and the ground electrode and a distance between the metal rod and the ground electrode when a voltage is applied to the metal rod.

11. The processing chamber of claim 10, wherein the metal rod is configured to transmit a voltage between about 50 V and about 500 V.

12. The processing chamber of claim 10, wherein the metal rod and the ground electrode define a space therebetween.

13. The processing chamber of claim 12, wherein the space is substantially a toroid.

14. The processing chamber of claim 10, further comprising:

a contact electrically coupled to the ground electrode, the contact configured to receive a metric from the measuring section.

15. The processing chamber of claim 10, further comprising:
an upstream coupling connecting the upstream fluid conduit to the first end of the ground electrode; and
a downstream coupling connecting the downstream fluid conduit to the second end of the ground electrode.

16. The processing chamber of claim 15, wherein the upstream coupling and the downstream coupling are made of a plastic material.

17. The processing chamber of claim 10, wherein the upstream fluid conduit and the downstream fluid conduit are made of a plastic material.

18. The processing chamber of claim 10, further comprising:
a bypass, the bypass connecting the upstream fluid conduit to the downstream fluid conduit, wherein the bypass is configured to flow a first portion of process fluid from the upstream fluid conduit without flowing the first portion through the measuring section, and a second portion of process fluid from the upstream fluid conduit through the measuring section, the first portion and the second portion of the process fluid flowing through the downstream fluid conduit.

19. A method of detecting contamination in a process fluid, comprising:
determining an electrical resistivity of a process fluid entering or exiting a process chamber, wherein the process chamber is disposed within a recirculation path, the process fluid circulating within the recirculation path, wherein a measurement probe is fluidically coupled to the recirculation path, the measurement probe comprising:
a measuring section, comprising:
a metal rod; and
a ground electrode coaxial with the metal rod, the metal rod and the ground electrode defining a space therebetween for flowing the process fluid through the recirculation path;
outputting an electrical metric from the measurement probe corresponding to the electrical resistivity of the process fluid;
comparing the electrical resistivity to a threshold, the threshold corresponding to a level of contamination of the process fluid, wherein the measuring section is configured to provide a metric of resistivity of a fluid based upon a surface area of the ground electrode within the space and a distance between the metal rod and the ground electrode when a voltage is applied to the metal rod; and
replacing one or more recirculation components disposed in the recirculation path, if the threshold is met or exceeded.

20. The method of detecting contamination in the process fluid of claim 19, wherein the one or more recirculation components is a particle filter configured to filter contaminants greater than or equal to about 6 micrometers.

* * * * *